Oct. 14, 1941.  F. H. McCORMICK  2,259,258

DOMESTIC APPLIANCE

Filed Oct. 22, 1938

OFF

HIGH

SIM

CENTER

MED.

LOW

INVENTOR.
Francis H. McCormick
BY Spencer Hardman and Lehr
ATTORNEYS

Patented Oct. 14, 1941

2,259,258

UNITED STATES PATENT OFFICE 2,259,258

DOMESTIC APPLIANCE

Francis H. McCormick, Dayton, Ohio, assignor to General Motors Corporation, Dayton, Ohio, a corporation of Delaware Application October 22, 1938, Serial No. 236,471

12 Claims. (Cl. 219—20)

This invention relates to a domestic appliance, and more particularly to heating systems for electric surface heaters or hot plates and the like.

In heating systems for electric surface heaters or hot plates and the like, it is desirable to provide different heating rates including one having a very high output for rapid heating and a number of lower heat outputs within the cooking range. I find that systems heretofore provided have not had a sufficient number of properly varied heat outputs concentrated within the cooking range. Some, for example, have their lowest heat input as low as 75 watts, which is not sufficient to maintain foods at a cooking temperature. Others fail to provide a heating rate satisfactory for steaming and stewing purposes. Therefore, with such an arrangement, foods could not be kept on a single heat after preheating, as it was necessary to alternate between different heating positions in order to obtain the desired heating rate for different requirements.

It is, therefore, an object of my invention to provide a heating system having a number of different useful heating outputs within the cooking range.

It is another object of my invention to provide a heating system which reduces to a minimum the necessity of switching from one heating speed to another;

It is another object of my invention to provide a heating system providing heating rates suitable for simmering and frying.

It is another object of my invention to provide a heating system providing heating rates especially useful for simmering, steaming, and boiling, for deep frying, for pre-heating and for heating small utensils.

It is still another object of my invention to provide a heating system having several additional highly useful heating rates in addition to the high, medium and low heats which heretofore have been widely used.

Further objects and advantages of the present invention will be apparent from the following description, reference being had to the accompanying drawing wherein a preferred form of the present invention is clearly shown.

Figure 1:
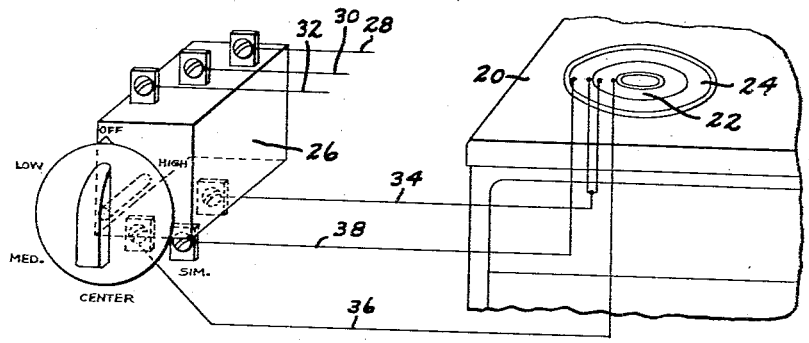
Fig. 1 is a fragmentary view of an electric range together with a heating system therefor.

Briefly, I have shown a portion of an electric range with a surface heater formed of an inner ring rated at 115 volts and 400 watts, and an outer ring rated at 230 volts and 800 watts. These units are supplied with electric energy from a standard 115–230 three-wire power source, generally used for electric ranges. A five-heat switch connects the two heaters to the source of energy so as to provide combinations of connections giving five different heating rates, in addition to the "off" position. At one side of the "off" position is the "high" position in which the inner ring is connected directly across one of the outside wires and the neutral wire to provide an output of 400 watts at 115 volts, while the outer ring is connected across both outside wires to provide a heat output of 800 watts at 230 volts providing a combined heat output of 1200 watts. In the "simmer" position, both rings are connected in series across one of the outside wires and the neutral wire to provide a combined output of about 135 watts at 115 volts. In the "center" position, only the inner ring is connected across one of the outside wires and the neutral wire to provide a total output of 400 watts at 115 volts. In the "medium" position, the inner ring is connected across one of the outside wires and the neutral wire to provide full output of 400 watts at 115 volts for it, while the outer ring is also connected across one of the outside wires and the neutral wire to provide about one-fourth full output of 200 watts at 115 volts for it, making a total of about 600 watts. When the switch is turned to the "low" position, only the outside ring is connected across one of the outside wires and the neutral wire to provide an output of about 200 watts at 115 volts. These various heating rates I find especially suitable.

Such a heating system is obviously applicable to other surface heaters of different sizes and capacities. For example, this heating system may also be used for a 2,000 watt surface heater, larger in diameter, and having a maximum heat output of 600 watts at 115 volts for the inner ring and 1400 watts at 230 volts for the outer ring. In such a heater, the inner ring measures about 3" I. D. and 5" O. D. The outer ring measures about 5¼" I. D. and 8" O. D. In the "medium" position, the inner ring is used at 600 watts, 115 volts, and the outer ring is used at 350 watts at 115 volts to provide a total heat output of 950 watts. In the "center" or "medium-low" position, only the inner ring is used at 115 volts to provide 600 watts. In the "low" heat position, only the outer ring is used at 115 volts to provide a heat output of 350 watts. In the "simmer" position, both rings are connected in series at 115 volts to provide a total heat output of about 210 watts. All the figures of the drawing would be equally applicable to such a heater.

Referring now to the drawing, and more particularly to Fig. 1, there is shown an electric range 20 having an electric surface heater or hot plate formed of an inner ring 22 and an outer ring 24. The inner ring measures about 2¼" I. D. and 4½" O. D. The outer ring measures about 4½" I. D. and 6½" O. D. These two rings are controlled by a 6-position switch 26 having a rotatable operating knob with a pointer cooperating with indications providing an "off" position and "high," "simmer," "center," "medium," and "low" heat positions clearly shown in Fig. 1. This switch is connected to the supply conductors 28 and 30 which form the outside wires of the three-wire system, and to the conductor 32, which is the neutral conductor of the three-wire system.

As is well known in the art, in this system, the voltage across the conductors 28 and 30 is twice that between either one of the conductors 28 and 30, and the neutral conductor 32. In such a system, it is customary to carry from 220 to 235 volts across the conductors 28 and 30 and to carry from 110 to 117 volts across either of the conductors 28 and 30 and the neutral conductor 32.

Figure 2:
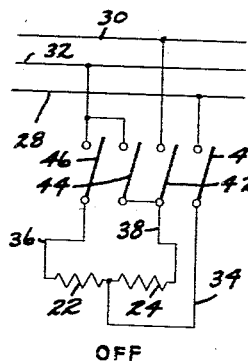
Fig. 2 is a wiring diagram of the heating system with the switch in the "off" position.
Figure 3:
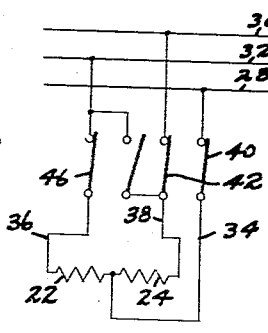
Fig. 3 is a wiring diagram of the heating system with the switch in the "high" heat position.

The switch 26 is also connected by the conductor 34 to one end of each of the heaters 22 and 24, while the conductor 36 extends to the other end of the inner ring and the conductor 38 extends to the other end of the outer ring. In the "off" position, as shown in the wiring diagram of Fig. 2, all the conductors are disconnected from the power source. In Fig. 3, illustrating the switch connections in the "high" position, the conductor 34 is connected to the supply conductor 28 by the switch blade 40, while the conductor 38 is connected by the switch blade 42 to the conductor 30 and the conductor 36 is connected by the switch blade 46 to the neutral conductor 32. Thus, the heater 24 is connected across the two outside wires 28 and 30 providing 800 watts at 230 volts, and the heater 26 is connected across the outside conductor 30 and the neutral conductor 32 providing 400 watts at 115 volts. The switch blades 40 to 46 are enclosed in the switch 26 and operated by its knob in a manner shown diagrammatically in Figs. 2 to 7 inclusive. The "high" position is used for bringing foods to the cooking point, for heating water, for pan broiling, and for deep fat frying of potatoes (French fried). This heating unit has a high capacity on "high" as compared with other positions to bring foods to cooking point as rapidly as possible in order to save time in cooking.

Figure 4:
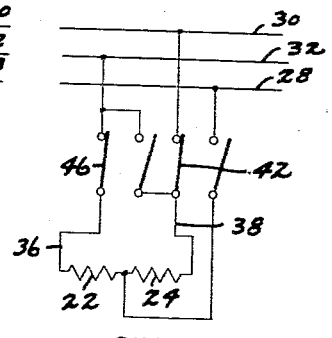
Fig. 4 is a wiring diagram of the heating system with the switch in the "simmer" position.

When the switch 26 is turned to the "simmer" position, as shown in Fig. 4, the switch blade 42 connects the outside conductor 30 to the heater 24 which is connected in series with the heater 22, which in turn is connected by the switch blade 46 to the neutral conductor 32. This connects the two heaters in series at 115 volts and provides a total heat output of both heaters of about 135 watts. This is especially suitable for cooking custards and white sauce (cream sauce), stewing dried fruits, and for melting chocolate and butter. In general, it is used for all forms of slow cooking and also for simmering soups.

Figure 5:
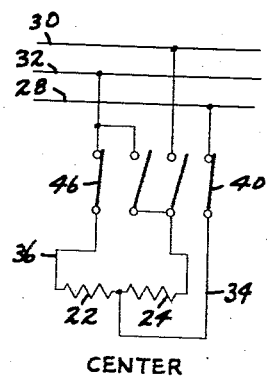
Fig. 5 is a wiring diagram of the system with the switch in the "center" or "medium-low" position.

When the switch is turned to the "center" position, also called "medium-low," as shown in Fig. 5, the switch blade 40 is closed to connect the outside conductor 28 to the conductor 34 connecting to the inner ring 22 which, in turn, is connected to the conductor 36 and the switch blade 46 to the neutral conductor 32. This provides full output of the inner ring of 400 watts at 115 volts. This position is especially suitable for cooking coffee and for small utensils which are not large enough to cover the entire hot plate.

Figure 6:
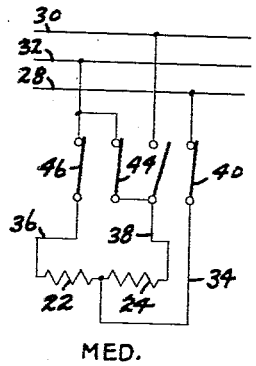
Fig. 6 is a wiring diagram of the heating system with the switch in the "medium" or "medium-high" position.

In Fig. 6, is shown the connections when the switch is turned to the "medium" position, also called "medium-high." In this position, the blade 40 is closed, connecting the conductor 34 to the outside conductor 28; the switch blade 44 is closed, connecting the other end of the outside ring 24 to the neutral conductor 32 and the switch blade 46 is closed, connecting the other end of the inner ring 22 also to the neutral conductor 32, thus connecting both rings in parallel across the 115 volts to provide a full output of 400 watts from the inner ring and about one-fourth output of 200 watts from the outer ring. This "medium" or "medium-high" position is especially suitable for the deep fat frying of croquettes and doughnuts, as well as for browning meats. This position can also be used for making griddle cakes.

Figure 7:
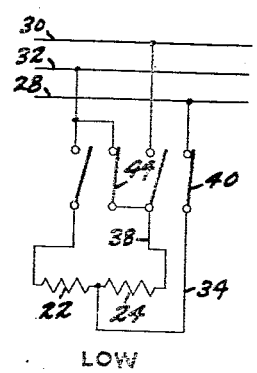
Fig. 7 is a wiring diagram of the system with the switch in the "low" position.

In the "low" position, shown in Fig. 7, the switch blades 40 and 44 are closed to connect the conductor 34 and the outer ring 24 to the outer conductor 28 and the conductor 38 to the neutral conductor 32 to provide an output of 200 watts at 115 volts. This position is used for ordinary cooking and steaming, particularly vegetables. More heat than this merely provides faster boiling or faster steaming, which does not increase the cooking speed. It is used for cooking requiring a faster rate than the simmer rate, particularly boiling and active steaming.

I have found other heating systems with a heating rate for the simmer position which is only about 75 watts, which is altogether inadequate for simmering purposes, because it is not sufficient to keep anything at a cooking temperature. I have found others where the "medium" or "medium-high" position is about 750 watts, which is too high for most cooking purposes. In my system, I have concentrated the heats within the range most useful for cooking purposes. I have done this without using external resistances.

It is particularly important in making use of my system that the heat output of the inner ring be roughly one-half the heat output of the outer ring, and that the inner ring have its maximum output upon 115 volts, while the outer ring has its maximum output upon 230 volts. While I have illustrated my invention as applying to a 1200 watt surface heater formed of an 800 watt outer ring and a 400 watt inner ring, it is equally applicable to other forms of two-element heaters not using the inner and outer ring system, particularly those having one element concentric or wholly enclosed within another. It is, of course, applicable to heaters of different sizes and capacities, such as, for example, the 2000 watt heater of 1400 watt capacity on the outer ring and 600 watt capacity on the inner ring previously mentioned. By this system, I have made electric ranges more usable, and made it possible to cook with less attention to changing the switch controlling the heating rate from one position to another.

While the form of embodiment of the invention as herein disclosed constitutes a preferred form, it is to be understood that other forms might be adopted, all coming within the scope of the claims which follow.

What is claimed is as follows.

1. An electrical heating system for a hot plate of an electric range and the like comprising a three-wire source having a relatively high voltage across two of said wires as compared with that across either of said two wires and a third wire, a heat generating element for said hot plate comprising a plurality of resistance elements, one made to operate at full capacity when connected across said two wires and another made to operate at full capacity when connected to one of said two wires and a third wire; means movable to one position for connecting the two resistance elements in parallel electrical circuit relation across one of said two wires and the third wire to provide a heating speed substantially less than full heat and movable to a second position for connecting the two resistance elements in series circuit relation across one of said two wires and the third wire to provide a slow heating speed, said means being movable to a third position to connect said one resistance element across said two wires and said another resistance element to one of said two wires and a third wire to provide full wattage input to each and movable to a fourth position to connect said another resistance element to one of said two wires and a third wire to provide full wattage input to only one of the elements and also movable to a fifth position to connect said one resistance element alone across one of said two wires and the third wire.

2. An electrical heating system for a hot plate of an electric range and the like comprising a three-wire source having a relatively high voltage across two of said wires as compared with that across either of said two wires and a third wire, a heat generating element for said hot plate comprising a plurality of resistance elements, one of said resistance elements having a maximum wattage input roughly twice the maximum wattage input of the second; means having one position for connecting said one and the second resistance element to said source to provide the maximum wattage input to each, and movable to a second position for so connecting said elements to said source to provide full wattage input to said second element and roughly one-fourth the maximum wattage input of said one element, said means having still a third position for connecting both said resistance elements in series across one of said two wires and the third wire.

3. An electrical heating system for a hot plate of an electric range and the like comprising a three-wire source having a relatively high voltage across two of said wires as compared with that across either of said two wires and a third wire, a heat generating element for said hot plate comprising a plurality of resistance elements, one of said resistance elements having a maximum wattage input roughly twice the maximum wattage input of the second; means having one position for connecting said one and the second resistance element to said source to provide the maximum wattage input to each, and movable to a second position for so connecting said elements to said source to provide full wattage input to said second element and roughly one-fourth the maximum wattage input of said one element, said means having still a third position for connecting both said resistance elements in series across one of said two wires and the third wire, and a fourth position for so connecting only said second element to said source to provide maximum wattage input to it alone, as well as a fifth position for so connecting only said one element to said source to provide only roughly one-fourth maximum wattage input to it alone.

4. An electric heating system for a hot plate of an electric range and the like, comprising a three wire power source having a relatively high voltage across two of said wires as compared with that across either of said two wires and a third wire, a heat generating element for said hot plate comprising a plurality of resistance elements, one of said elements being constructed to operate at full capacity on said relatively high voltage and the second being constructed to operate at full capacity when connected across one of said two wires and a third means movable to one position for connecting one of said resistance elements across said two wires and the second resistance element across one of said two wires and third wire, said means being movable to a second position for connecting said one and said second resistance elements in parallel electrical circuit relation across one of said two wires and a third wire to provide a heating speed with substantially less than the wattage input of the first mentioned position, said means being movable to a third position for connecting the one and the second resistance elements in series circuit relation across one of said two wires and a third wire to provide a slow heating speed.

5. An electrical heating system for a hot plate of an electric range and the like comprising a three wire power source having a relatively high voltage across two of said wires as compared with that across either of said two wires and a third wire, a heat generating element for said hot plate comprising a plurality of resistance elements, one of said elements being constructed to operate at full capacity on said relatively high voltage and the second being constructed to operate at full capacity when connected across one of said two wires and a third one of said elements having a maximum allowable wattage input of roughly twice that of the second resistance element, means movable to one position for connecting the first mentioned resistance element across said two wires and at the same time connecting the second resistance element across one of said two wires and a third wire, said means being movable to a second position for connecting said one and said second resistance elements in parallel electrical circuit relation across one of said two wires and the third wire to provide a heating speed substantially less than the heating speed in the first mentioned position, said means being movable to a third position for connecting said one and said second resistance elements in series circuit relation across one of said two wires and a third wire to provide a slow heating speed.

6. An electrical heating system for a hot plate of an electric range and the like comprising a three wire power source having a relatively high voltage across two of said wires as compared with that across either of said two wires and a third wire, a heat generating element for said hot plate comprising a high voltage resistance element and a low voltage resistance element constructed to operate at full capacity when connected across one of said two wires and the third wire, means movable to one position for connecting the high voltage resistance element across said two wires and the low voltage resistance element across one of said two wires and the third wire to provide a first heating speed, said means being movable to a second position for connecting the high and low voltage resistance elements in parallel electrical circuit relation across one of said two wires and the third wire to provide a second heating speed, said means being movable to a third position to disconnect the high voltage resistance element from the power source and to connect only the low voltage resistance element across one of said two wires and the third wire, said means being movable to a fourth position to connect said high voltage resistance element alone across one of said two wires and the third wire to disconnect the low voltage resistance element from the power source, said means being movable to a fifth position for connecting the high and low voltage resistance elements in series circuit relation across one of said two wires and the third wire to provide a slow heating speed.

7. An electrical heating system comprising a three-wire electrical supply source having two main wires and a neutral wire, providing a high voltage across the main wires and a reduced voltage between the main and neutral wires, a high voltage electric heater, a low voltage electric heater constructed to operate at full capacity upon said reduced voltage; a single multi-position switch for controlling said heaters, said switch having one position connecting the high voltage heater across the main wires and the low voltage heater across one of the main wires and the neutral wire, said switch having another position connecting the low voltage heater only across one of the main wires and the neutral wire and disconnecting the high voltage heater from all wires, said switch having still a third position connecting the high voltage electric heater across one of the main wires and the neutral wire.

8. An electrical heating system for a hot plate of an electric heater comprising a three-wire source having a relatively high voltage across two of said wires as compared with that across either of said two wires and a third wire, a single heat generating element for said hot plate including a plurality of resistance elements, a first of said resistance elements being constructed to operate at full capacity when it is connected to said two wires, a second of said resistance elements being constructed to operate at full capacity when it is connected to one of said two wires and said third wire, a single multi-position switch controlling said resistance elements arranged in one position to connect simultaneously said first resistance element to said two wires and said second resistance element to one of said two wires and said third wire in order to produce a high heat generation for said hot plate, and in another position to connect only said second resistance element to one of said two wires and said third wire and substantially simultaneously disconnecting said first resistance element from said wires.

9. An electrical heating system for a hot plate of an electric heater comprising a three-wire source having a relatively high voltage across two of said wires as compared with that across either of said two wires and a third wire, a single heat generating element for said hot plate including a plurality of resistance elements, a first of said resistance elements being constructed to operate at full capacity when it is connected to said two wires, a second of said resistance elements being constructed to operate at full capacity when it is connected to one of said two wires and said third wire, said second resistance element when so connected having a substantially smaller wattage input than said first resistance element when so connected, a single multi-position switch controlling said resistance elements arranged in one position to connect simultaneously said first resistance element to said two wires and said second resistance element to one of said two wires and said third wire in order to produce a high heat generation for said hot plate, and in another position to connect only said first resistance element to one of said two wires and said third wire and substantially simultaneously disconnecting said second resistance element from said wires to provide a low wattage input for low heat generation.

10. An electrical heating system for a hot plate of an electric heater comprising a three-wire source having a relatively high voltage across two of said wires as compared with that across either of said two wires and a third wire, a single heat generating element for said hot plate including a plurality of resistance elements, a first of said resistance elements being constructed to operate at full capacity when it is connected to said two wires, a second of said resistance elements being constructed to operate at full capacity when it is connected to one of said two wires and said third wire, a single multi-position switch controlling said resistance elements arranged in one position to connect simultaneously said first resistance element to said two wires and said second resistance element to one of said two wires and said third wire in order to produce a high heat generation for said hot plate, and in another position to connect only said second resistance element to one of said two wires and said third wire and substantially simultaneously disconnecting said first resistance element from said wires, said switch having still another position arranged to connect said first resistance element with one of said two wires and the third wire and simultaneously to disconnect the second resistance element from said wires.

11. An electrical heating system for a hot plate of an electric heater comprising a three-wire source having a relatively high voltage across two of said wires as compared with that across either of said two wires and a third wire, a single heat generating element for said hot plate including a plurality of resistance elements, a first of said resistance elements being constructed to operate at full capacity when it is connected to said two wires, a second of said resistance elements being constructed to operate at full capacity when it is connected to one of said two wires and said third wire, a single multi-position switch controlling said resistance elements arranged in one position to connect simultaneously said first resistance element to said two wires and said second resistance element to one of said two wires and said third wire in order to produce a high heat generation for said hot plate, and in another position to connect only said second resistance element to one of said two wires and said third wire and substantially simultaneously disconnecting said first resistance element from said wires, and in a third position to connect each of said resistance elements across one of said two wires and a third wire.

12. An electrical heating system for a hot plate of an electric heater comprising a three-wire source having a relatively high voltage across two of said wires as compared with that across either of said two wires and a third wire, a single heat generating element for said hot plate including a plurality of resistance elements, a first of said resistance elements being constructed to operate at full capacity when it is connected to said two wires, a second of said resistance elements being constructed to operate at full capacity when it is connected to one of said two wires and said third wire, a single multi-position switch controlling said resistance elements arranged in one position to connect simultaneously said first resistance element to said two wires and said second resistance element to one of said two wires and said third wire in order to produce a high heat generation for said hot plate, and in another position to connect only said first resistance element to one of said two wires and a third wire and substantially simultaneously disconnecting said second resistance element from said wires, and in a third position to connect said first and second elements in series across one of said two wires and a third wire.

FRANCIS H. McCORMICK.